US011416374B1

(12) United States Patent
Wu et al.

(10) Patent No.: US 11,416,374 B1
(45) Date of Patent: Aug. 16, 2022

(54) DISTRIBUTED TRACING FOR BATCH WORKLOADS USING TRACE LINKING

(71) Applicant: Amazon Technologies, Inc., Seattle, WA (US)

(72) Inventors: Haotian Wu, Seattle, WA (US); Nizar Tyrewalla, Redmond, WA (US); Anssi Alaranta, Seattle, WA (US); Rohit Banga, Seattle, WA (US); Davi Nogueira Soares Menezes, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 16/836,188

(22) Filed: Mar. 31, 2020

(51) Int. Cl.
*G06F 9/44* (2018.01)
*G06F 11/36* (2006.01)
*G06F 9/54* (2006.01)

(52) U.S. Cl.
CPC .......... *G06F 11/3636* (2013.01); *G06F 9/547* (2013.01); *G06F 11/3612* (2013.01)

(58) Field of Classification Search
None
See application file for complete search history.

(56) References Cited

U.S. PATENT DOCUMENTS

| 11,030,068 | B1* | 6/2021 | Agarwal | G06N 5/025 |
| 2019/0089582 | A1* | 3/2019 | Bernardi | H04L 41/0803 |
| 2020/0073785 | A1* | 3/2020 | Alaranta | G06F 11/3476 |
| 2020/0201750 | A1* | 6/2020 | Gadiya | G06F 11/3495 |
| 2020/0328952 | A1* | 10/2020 | Makwarth | H04L 67/02 |
| 2021/0119892 | A1* | 4/2021 | Kant | G06F 11/3447 |
| 2021/0133014 | A1* | 5/2021 | Agarwal | G06F 11/079 |
| 2021/0149787 | A1* | 5/2021 | Nguyen | G06F 11/3006 |
| 2021/0232485 | A1* | 7/2021 | Agarwal | G06F 11/3419 |

* cited by examiner

*Primary Examiner* — Insun Kang
(74) *Attorney, Agent, or Firm* — Nicholson De Vos Webster & Elliott LLP

(57) ABSTRACT

Techniques for distributed tracing for batch workloads using trace linking are described. A method of distributed tracing for batch workloads using trace linking includes generating a decorator by a batch trace manager, the decorator identifying at least one first trace to be linked to at least one second trace, the at least one second trace corresponding to a message processed by a child service in a provider network, sending the decorator to a distributed tracing service in the provider network, and adding a virtual trace to a virtual trace map by the distributed tracing service, the virtual trace linking the at least one first trace and the at least one second trace.

17 Claims, 8 Drawing Sheets

```
DECORATOR 300

{
  "TRACE_ID"   : "1-5759E988-BD862E3FE1B46A994272793",
  "TARGET_ID"  : "53995C3F42CD8AD8", //THE TRACE ENTITY TO DECORATE
  "ID"         : "330458C048242D27" //DECORATOR ID
  "TYPE"       : "DECORATOR",
  "PARENT"    : [
  ],
  "CHILD" : [
      "1-5759E988-BC862E1FE1BE46A9942723840DEFDFD9912DC5A56" //TRACE
AND SEGMENT ID FOR NEW TRACE CREATED BY DOWNSTREAM SERVICE
  ]
}
```

```
SEGMENT AFTER MERGING WITH DECORATOR 302

{
  "TRACE_ID"   : "1-5759E988-BD862E3FE1B46A994272793",
  "ID"         : "53995C3F42CD8AD8",
  "NAME"       : [SERVICE NAME]
  "TYPE"       : "SUBSEGMENT",
  "START_TIME" : 1461096012,
  "END_TIME"   : 1461096014,
  "CHILD" : [
      "1-5759E988-BC862E1FE1BE46A9942723840DEFDFD9912DC5A56"
  ]
}
```

```
LINKED SEGMENT 304

{
  "TRACE_ID"   : "1-5759E988-BC862E1FE1BE46A994272384", //THE NEW
TRACE ID CREATED BY THE DOWNSTREAM SERVICE
  "ID"         : "DEFDFD9912DC5A56",
  "NAME"       : "BATCHPROCESSING"
  "START_TIME" : 1461096053,
  "END_TIME"   : 1461096053,
  "PARENT" : [
      "1-5759E988-BD862E3FE1B46A994272793@53995C3F42CD8AD8"
  ]
}
```

*FIG. 3*

DISTRIBUTED TRACING FOR BATCH WORKLOADS USING TRACE LINKING

BACKGROUND

Tracing is a way of logging activity across multiple services caused when a request is processed. This may be in response to a selection of a graphical user interface element, such as selection of a button, through an application programming interface (API) call, or when a request is received through another interface. When a request is processed, it may be passed through multiple services, e.g., the request might be authenticated, data associated with the request may be validated, etc. Tracing enables the request processing to be tracked across these services and helps developers identify any errors, performance issues, etc. that might impact end users.

BRIEF DESCRIPTION OF DRAWINGS

Various embodiments in accordance with the present disclosure will be described with reference to the drawings, in which:

FIG. 3 illustrates an example of linked traces according to some embodiments.

DETAILED DESCRIPTION

The present disclosure relates to methods, apparatus, systems, and non-transitory computer-readable storage media for distributed tracing for batch workloads using trace linking. According to some embodiments, a batch trace manager at a child service can link incoming traces with one or more new traces. In batch processing, multiple requests or messages are processed by a single child service. For example, customers using a serverless architecture enqueue messages to be periodically picked up by a function implemented in an on-demand code execution service. Previously, customers would see disconnected traces when requests were passing through a child service in batch processing. The batch trace manager can generate a decorator that is used by a distributed tracing service to link incoming traces with one or more new traces created by the service that is processing the incoming traces in batches. The batch trace manager can provide this decorator to a distributed tracing service which maintains the links between the traces. When a customer requests to view a trace using the distributed tracing service, the entire end-to-end trace, including one or more linked traces, is returned, giving the customer a more complete view of message processing in their application.

Figure 1:
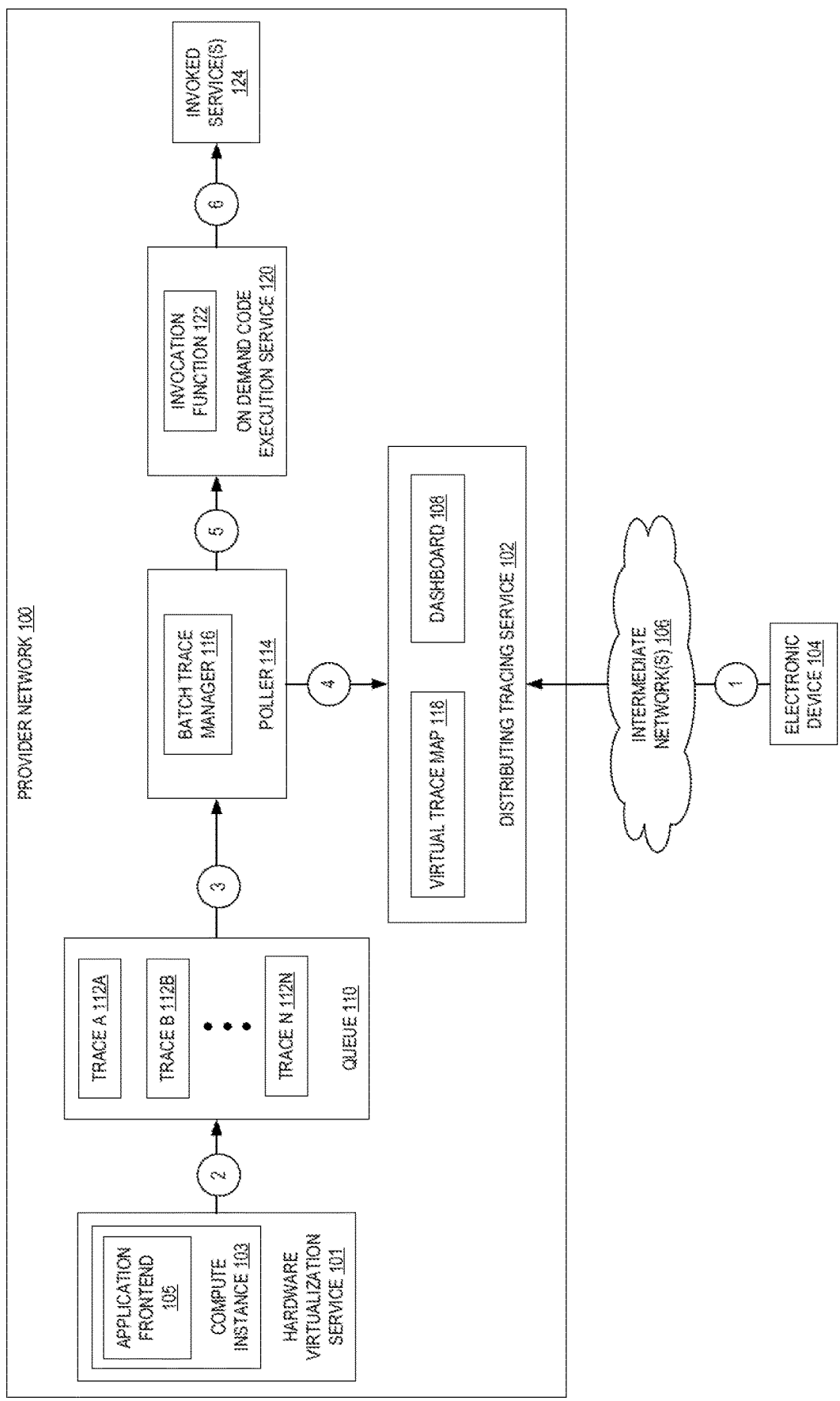
FIG. 1 is a diagram illustrating an environment for distributed tracing for fan-in batch workloads using trace linking according to some embodiments.

FIG. 1 is a diagram illustrating an environment for distributed tracing for fan-in batch workloads using trace linking according to some embodiments. As shown in FIG. 1, a customer using electronic device 104 can send a request, at numeral 1, to a distributing tracing service 102 to enable tracing for all or some of requests that are received by the customer's application. Although the embodiment shown in FIG. 1 shows a client external to provider network 100, in various embodiments, internal customers (e.g., other services of provider network 100, developers, etc.) may also send a request to distributed tracing service 102 to enable tracing on all or some of the requests that are received by their applications. In some embodiments, the customer can enable tracing through a dashboard 108 or other user interface provided by the distributed tracing service. In some embodiments, the customer may also access traces through dashboard 108. A customer's application may be a distributed application which includes various services, such as a microservices, of the provider network to provide the functionality of the application. In some embodiments, provider network 100 may include a hardware virtualization service 101 which may include a plurality of compute instances 103 which may host all or some of the components of the application, including the application frontend 105. Additional services of the application may include queue 110, poller 114, on-demand code execution service 122, invoked service(s) 126, etc. The application frontend 105 may receive requests from users of the application, which may include internal users whose requests are received by the application within the provider network and/or external users whose requests are received from external to the provider network over one or more intermediate networks 106.

When tracing is enabled for an application, requests that are received by the application, via application frontend 105, are assigned a trace identifier. In some embodiments, each request may be assigned a unique trace ID. As the request makes its way through various services of the application, the services relay information regarding the request back to distributed tracing service 102 using this trace ID. The piece of information relayed by each service in the application to distributed tracing service 102 is a segment, and a trace is a collection of segments or other linking entities. For example, a linking entity may include a trace segment or a trace subsegment. A trace segment encapsulates data points for a single service (for example, an authorization service, queue 110, poller 114, on-demand code execution service 122, invoked service(s) 126, etc.) of the application. Segments may include system-defined and user-defined data in the form of annotations and may include one or more sub-segments that represent remote calls made from the service. For example, when the application makes a call to a database in response to a request, the application creates a segment for that request with a sub-segment representing the database call and its result. The sub-segment can include data such as the query, table used, timestamp, error status, etc. As shown in FIG. 1, when application frontend 105 receives a request from a user, the request is assigned a trace ID and the request is added to queue 110, at numeral 2. Queue 110 may include a plurality of queued requests, each associated with a different trace ID, such as trace A 112A, trace B 112B . . . trace N 112N. These requests are then asynchronously processed in batches by poller 114 and on-demand code execution service 122.

In a traditional distributed tracing system, the batch processing of the requests in queue 110 would break the trace. For example, in the embodiment shown in FIG. 1, if trace A and trace B are pulled from queue 110 and processed by a child service in a batch, the trace ID for trace A or trace B could be used by the next segment, but whichever trace ID is not used would no longer be tracked as the requests are processed. Accordingly, a batch trace manager 116 has been added which can generate a decorator that can be used to link a trace for subsequent processing to the received traces without additional input from the customer. As used herein a parent service may correspond to the sender of a request and a child service may correspond to a service that receives a request from a parent.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

A cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown at numeral 3, a poller 114 may periodically pull queued requests from queue 110 in batches. When a new batch of requests is received, the poller can identify any requests that are associated with trace IDs 112A-112N and provide this information to batch trace manager 116. If a request in the batch is associated with a trace ID, the batch trace manager 116 can create a decorator which identifies a linking entity (e.g., segment) corresponding to the parent service and a new trace ID and a linking entity (e.g., segment) created by the poller. Once the new trace has been created, at numeral 4 the batch trace manager can send the decorator to distributing tracing service 102 which can then link the new trace ID to the parent trace ID. For example, if the batch includes trace A 112A and trace B 112B, then batch trace manager can send a decorator to distributing tracing service 102 linking trace A to new trace C created by poller 114 and a decorator to distributed tracing service 102 linking trace B to new trace C.

Decorators are a way to update linking entities that are otherwise immutable. When the batch trace manager 116 sends a decorator, it is indicating that a batch of messages are being processed and that one or more of those messages are associated with a trace which is to be linked to a new trace. The distributed tracing service 102 can update a virtual trace map 118 to indicate the linkage. The virtual trace map may include an entry for each trace (e.g., trace A-trace N, in the example of FIG. 1) which links the trace to a new trace being created by the poller. In various embodiments, the virtual trace map can be implemented as a table or other data structure.

When customers request to view a trace through dashboard 108, the distributing tracing service can lookup the requested trace in the virtual trace map and provide the requested trace and any linked traces. The links maintained in the virtual trace map 118 may be bi-directional, so if trace A is linked to trace C, when the customer requests either trace A or trace C, then both traces are returned. In some embodiments, when the traces are returned, statistics (e.g., response time) related to the traces may be re-computed to reflect that the traces are combined. The requested trace and any linked traces are combined before being provided to the customer. Additionally, or alternatively, the linking information may be included in the trace itself. For example, the parent trace ID and a linking entity ID, such as a segment ID or a subsegment ID, may be included in a field of subsequent linked segments.

Once the traces have been linked, at numeral 5, the poller can invoke the next child service. In the example of FIG. 1, the next child service is an on-demand code execution service 120 which implements and invocation function 122. The invocation function 122 may be associated with one or more further child invoked service(s) 124. At numeral 6, the invocation function 122 invokes the invoked service(s) 124 to further process the requests. Processing of the requests from the poller to the invoked services in this example will be associated with the new trace ID, with each component associated with a different segment of the new trace.

As shown in FIG. 1, the batch trace manager 116 is implemented in poller 114 to enable batch mode trace processing. In various embodiments, a batch trace management may be implemented in any component which is processing a batch of messages to enable trace linking. In some embodiments, a customer may provider their own queue processor which has functionality similar to the poller 114. The customer can include a batch trace manager to send the data needed by the distributed tracing service to implement trace linking in the queue processor to link the queue processor to the distributed tracing service and provide the trace linking features described above.

Figure 2:
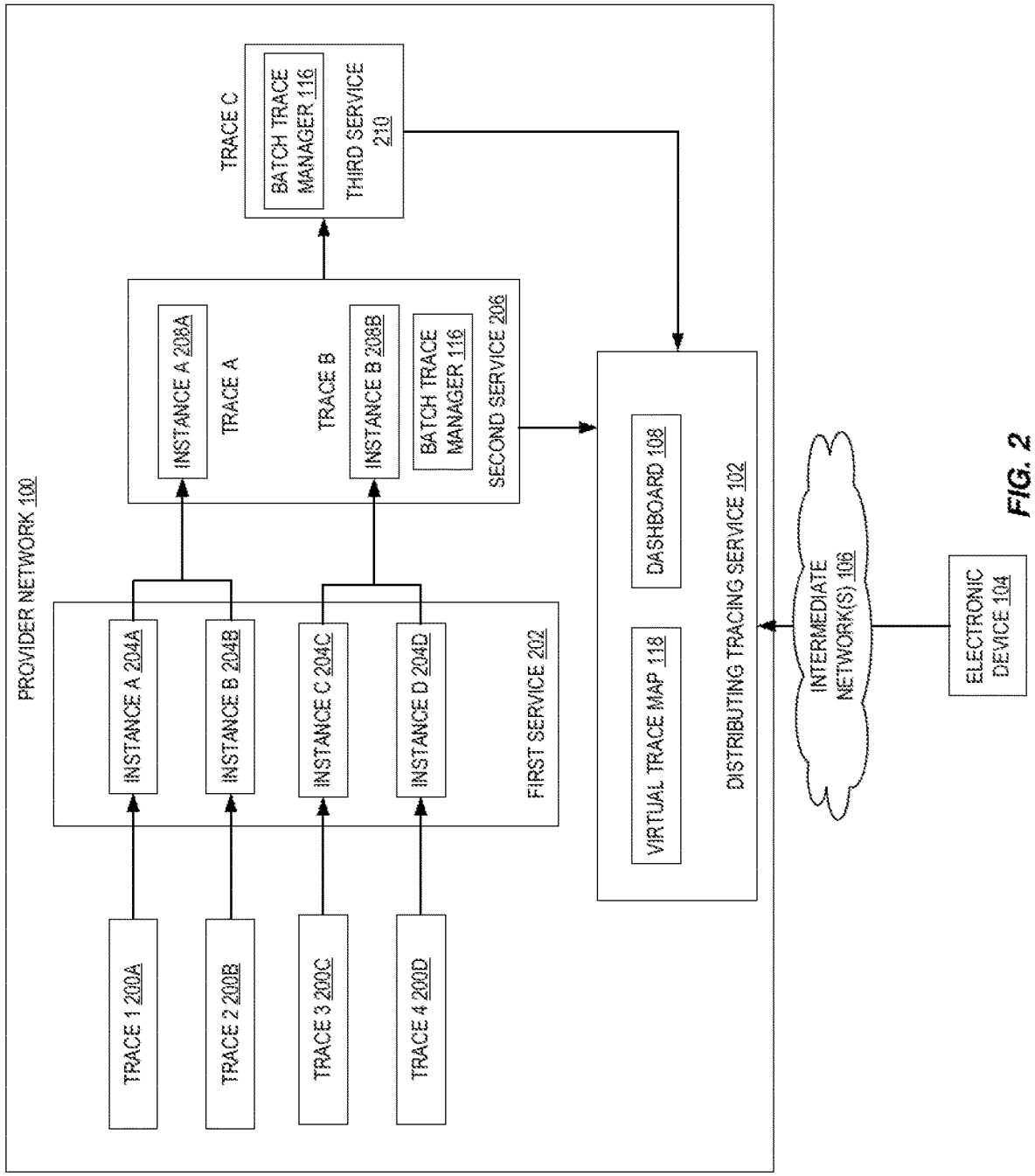
FIG. 2 is a diagram illustrating an environment for distributed tracing for multiple batch workloads using trace linking according to some embodiments.

FIG. 2 is a diagram illustrating an environment for distributed tracing for multiple batch workloads using trace linking according to some embodiments. As discussed above, a component processing batches of requests may implement a batch trace manager send the data needed to link incoming traces to a new trace created by the component to the distributed tracing service. As discussed, this data may include a decorator that identifies a linking entity associated with a parent service to a linking entity of a child service. As shown in FIG. 2, multiple such components may occur in the message processing flow of a given application. For example, four traces 200A-200D may correspond to requests received by a first service 202. In some embodiments, a different instance of the first service 204A-204D may receive each of the four requests. Alternatively, a single instance of the first service may process a plurality of the requests. The first service 202 may add a segment to each trace for the processing that occurs on the requests by the first service. Since the first service is processing each request individually, the first service does not need a batch trace manager to link incoming traces to new traces.

The application may further include a second service 206, which processes batches of requests from the first service. For example, trace 1 200A and trace 2 200B may both be processed by a first instance 208A of second service 206 and traces 3 and 4 200C and 200D may both be processed by a second instance 208B of second service 206. Because the second service is processing batches of incoming requests, the second service creates a new trace for each batch (e.g., trace A and trace B) and links the incoming requests to the new traces. As such, second service 206 includes batch trace manager 116 to send decorators to distributing tracing service 102 linking traces 1 and 2 to new trace A, and traces 3 and 4 to new trace B. Similarly, the application may include a third service 210 which processes batches of requests from second service 206. The third service also includes a batch trace manager to send decorators to the distributed tracing service to link the incoming traces (trace A and trace B) to new trace C created by the third service. The virtual trace map can map each of the traces to their linked traces. For example, trace 1 is linked to trace A and trace A is linked to trace C. When a request for trace 1 is received, it is looked up in virtual trace map 118, and the links to traces A and C are identified. The trace that is returned to the requestor will be the combined trace of traces 1, A, and C.

FIG. 3 illustrates an example of linked traces according to some embodiments. As shown in FIG. 3, a decorator 300 send by a batch trace manager to the distributed tracing service may include a "trace ID" field for the incoming trace and a "target ID" field for the segment or other linking entity (such as a segment or subsegment) that is to be decorated. In some embodiments, each segment of a trace corresponds to a different service. Some services may add subsegments that correspond to different processing performed by that service. Using the example of FIG. 1, the trace ID may correspond to trace A, and the target ID may correspond to the segment ID for queue 110. The decorator can also include a "child" field which includes the trace and segment ID for the child trace that is being created. Again, using the example of FIG. 1, the new trace ID and segment ID created by the poller 114 may be included in the decorator.

Once the decorator is received, the linked segment identified in the decorator can be merged with the decorator, as shown at 302. The segment may now include a "child" field that includes the new trace ID and segment ID created by the child service. As shown in FIG. 3, this trace format may be represented as [traceID]@[segmentID]. Linked segment 304 shows the new segment created by the child service that created the new trace. This segment includes a "trace ID" field which includes the identifier for the new trace created by the child service (this matches the trace ID referenced in the decorator 300). Additionally, the linked segment includes an "parents field" that includes the trace identifier for the original trace and the segment identifier for the segment preceding linked segment 304 in the trace. Using the example of FIG. 1, the linked segment 304 corresponds to the segment of the new trace created by poller 114 and the preceding segment corresponds to the segment created for queue 110.

Figure 4:
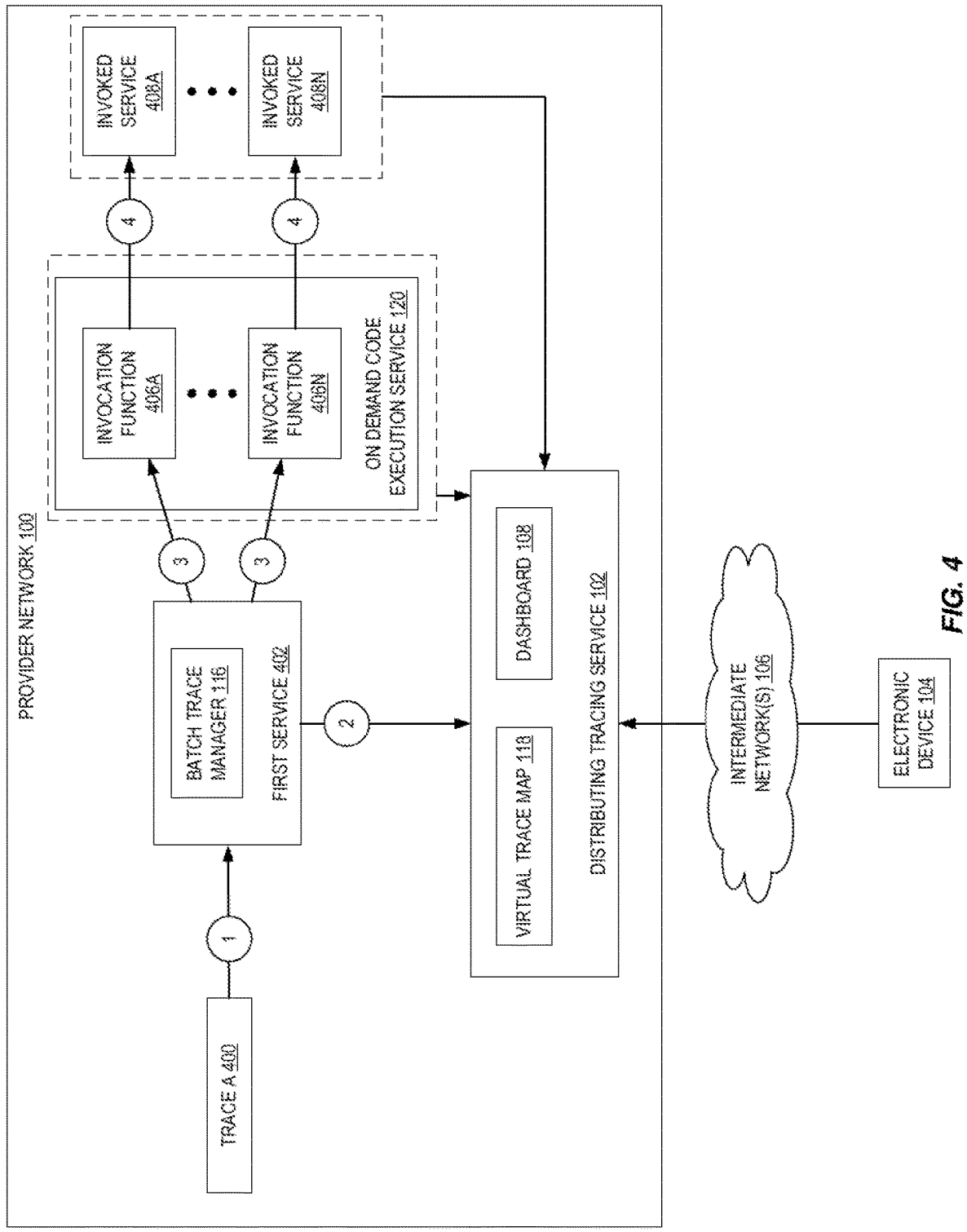
FIG. 4 is a diagram illustrating an environment for distributed tracing for fan-out batch workloads using trace linking according to some embodiments.

FIG. 4 is a diagram illustrating an environment for distributed tracing for fan-out batch workloads using trace linking according to some embodiments. In addition to the fan-in example described above, embodiments may also support fan-out processing. Fan out processing occurs where a single incoming request leads to the invocation of multiple child services in parallel. For example, as shown in FIG. 4, at numeral 1 trace A 400 can be received by a first service 402 which includes a batch trace manager 116. First service 402 may be invoking multiple serverless functions to process the request associated with trace A. The first service 402 can create a new trace for each child service that is being invoked in parallel and, at numeral 2, the batch trace manager 116 can send a decorator to the distributing tracing service linking each of these new traces to trace A. The first service 402 can then invoke a plurality of invocation functions 404A-404N in on demand code execution service 120. A new segment in each new trace may be added for the serverless invocation functions. The invocation functions can then invoke corresponding additional services 408A-408N which may also generate new segments for their corresponding traces. Subsequently, when the customer requests to view trace A through dashboard 108, the linked new traces will also be provided to the user, providing a more complete view of message processing across the customer's application.

Figure 5:
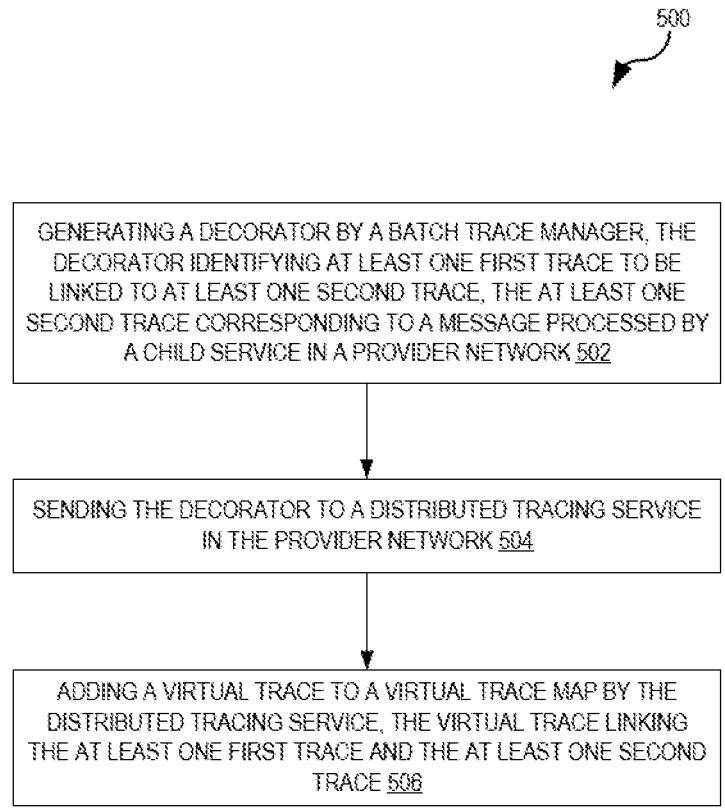
FIG. 5 is a flow diagram illustrating operations of a method for distributed tracing for batch workloads using trace linking according to some embodiments.

FIG. 5 is a flow diagram illustrating operations 500 of a method for distributed tracing for batch workloads using trace linking according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by distributed tracing service 102 or batch trace manager 116 of the other figures.

The operations 500 include, at block 502, generating a decorator by a batch trace manager, the decorator identifying at least one first trace to be linked to at least one second trace, the at least one second trace corresponding to a message processed by a child service in a provider network. In some embodiments, the child service obtains a plurality of messages corresponding to a plurality of traces including the at least one second trace, generates a second decorator identifying the plurality of traces to be linked to a third trace, and sends the second decorator to the distributed tracing service. In some embodiments, the operations may further include generating a plurality of messages to a plurality of child services, each of the plurality of messages corresponding to a plurality of traces including the at least one second trace.

The operations 500 further include, at block 504, sending the decorator to a distributed tracing service in the provider network. In some embodiments, the decorator identifies a linking entity of the at least one first trace to be linked and further identifies a linking entity of the at least one second trace.

The operations 500 further include, at block 506, adding a virtual trace to a virtual trace map by the distributed tracing service, the virtual trace linking the at least one first trace and the at least one second trace. In some embodiments, the virtual trace map is a data structure including an entry for each trace, and wherein the at least one first trace is bi-directionally linked to the at least one second trace based on the decorator. In some embodiments, a linking entity of the at least one second trace identifies a linking entity of the at least one second trace and the linking entity of the at least one first trace identifies the linking entity of the at least one second trace.

In some embodiments, the operations may further include obtaining a plurality of requests from a queue by a first service, the first service including the batch trace manager, at least one request corresponding to the at least one first trace. In some embodiments, the batch trace manager is implemented in a poller of an on demand code execution service and the child function is invoked by an invocation function executed by the on demand code execution service.

In some embodiments, the operations may further include receiving a request by the distributed tracing service to view the at least one first trace, determining the at least one first trace is linked to the at least one second trace using the virtual trace map, and returning the at least on first trace and the at least one second trace.

In some embodiments, the operations may include polling a queue in a provider network for requests, the requests added by at least one parent service, wherein at least one request is associated with at least one first trace, obtaining a batch of the requests including the at least one request associated with the at least one first trace, determining that the batch includes the at least one request associated with the at least one first trace, generating a decorator identifying the at least one first trace to be linked to at least one second trace, the at least one second trace corresponding to a message processed by a child service, sending the decorator to a distributed tracing service in the provider network, and adding a virtual trace to a virtual trace map by the distributed tracing service, the virtual trace linking the at least one first trace and the at least one second trace.

In some embodiments, the decorator identifies a linking entity associated with the at least one request of the at least one first trace to be linked and further identifies a linking entity associated with the message processed by the child service of the at least one second trace. In some embodiments, the virtual trace map is a data structure including an entry for each trace, and wherein the at least one first trace is bi-directionally linked to the at least one second trace based on the decorator.

Figure 6:
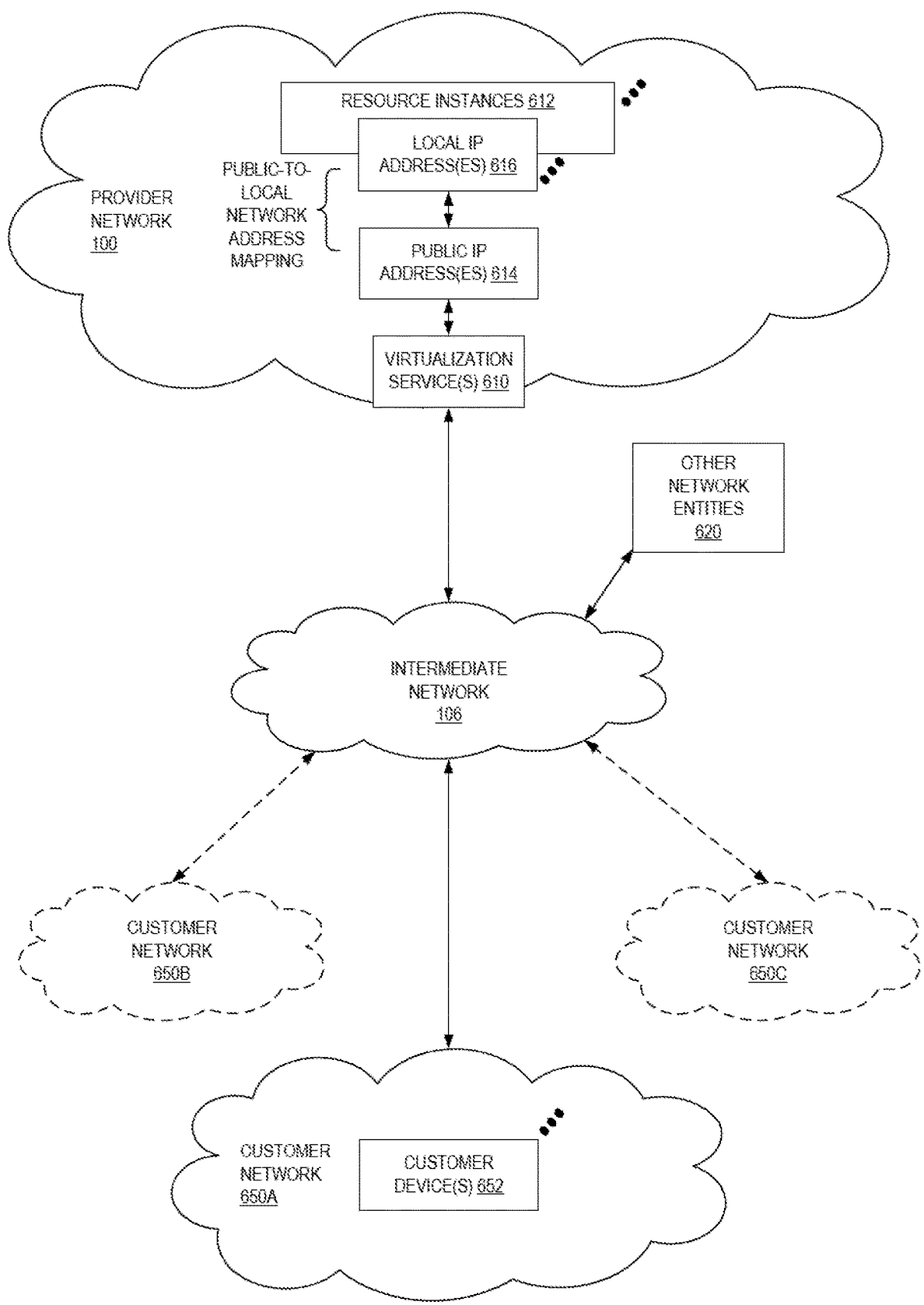
FIG. 6 illustrates an example provider network environment according to some embodiments.

FIG. 6 illustrates an example provider network (or "service provider system") environment according to some embodiments. A provider network 100 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 100. In some embodiments, the provider network 100 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 100, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 100 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 106, such as the Internet.

Other network entities 620 on the intermediate network 106 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 106 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 100; a customer may then assign their allocated public IP addresses to particular resource instances allocated to the customer. These public IP addresses may be referred to as customer public IP addresses, or simply customer IP addresses. Instead of being assigned by the provider network 100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
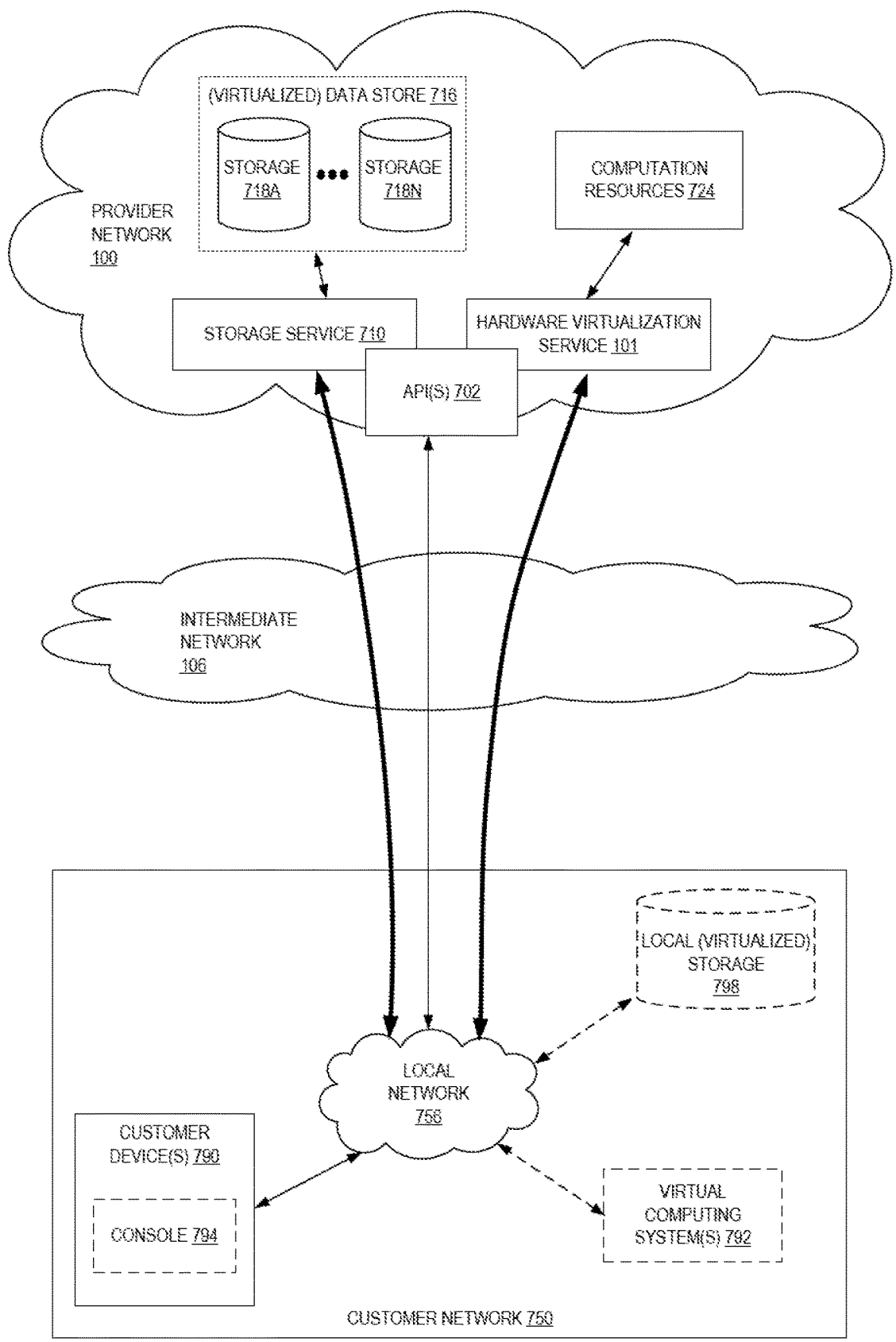
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 101 provides multiple computation resources 724 (e.g., VMs) to customers. The computation resources 724 may, for example, be rented or leased to customers of the provider network 100 (e.g., to a customer that implements customer network 750). Each computation resource 724 may be provided with one or more local IP addresses. Provider network 100 may be configured to route packets from the local IP addresses of the computation resources 724 to public Internet destinations, and from public Internet sources to the local IP addresses of computation resources 724.

Provider network 100 may provide a customer network 750, for example coupled to intermediate network 106 via local network 756, the ability to implement virtual computing systems 792 via hardware virtualization service 101 coupled to intermediate network 106 and to provider network 100. In some embodiments, hardware virtualization service 101 may provide one or more APIs 702, for example a web services interface, via which a customer network 750 may access functionality provided by the hardware virtualization service 101, for example via a console 794 (e.g., a web-based application, standalone application, mobile application, etc.). In some embodiments, at the provider network 100, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 100. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 100 via API(s) 702. For example, a customer, appliance service provider, or other entity may access a virtualization service from within a respective virtual network on the provider network 100 via an API 702 to request allocation of one or more resource instances within the virtual network or within another virtual network.

Illustrative Systems

Figure 8:
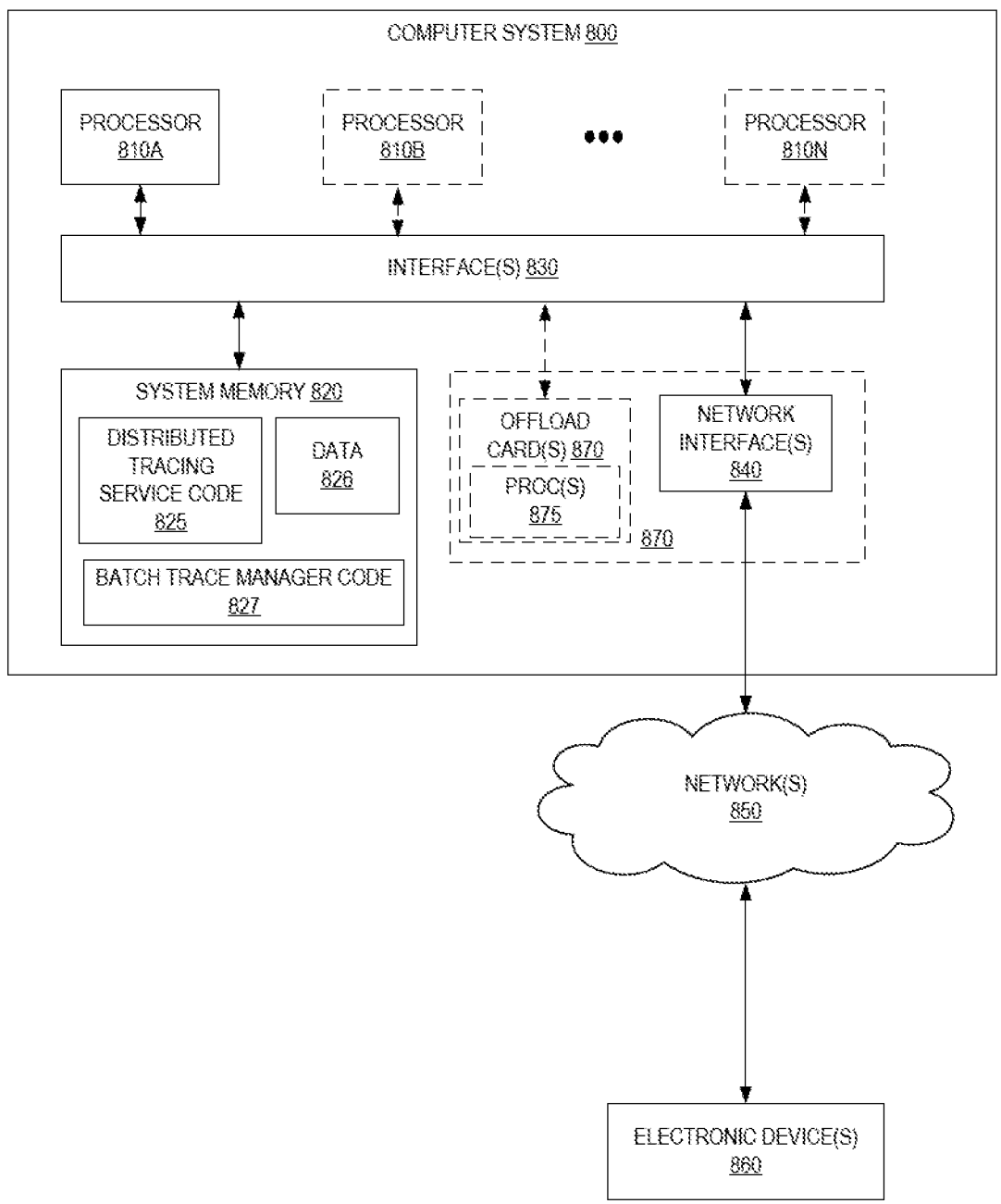
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as distributed tracing service code 825, batch trace manager code 827, and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
polling a queue in a provider network for requests, the requests added by at least one parent service, wherein at least one request of the requests is associated with at least one first trace;
obtaining a batch of the requests including the at least one request associated with the at least one first trace;
determining that the batch includes the at least one request associated with the at least one first trace;
generating a decorator identifying the at least one first trace as being linked to at least one second trace that is associated with another request of the requests, the another request processed by a child service of the at least one parent service;
sending the decorator to a distributed tracing service in the provider network; and
adding, by the distributed tracing service, a virtual trace to a virtual trace map comprising a data structure including an entry for each trace, the virtual trace linking the at least one first trace and the at least one second trace, wherein the at least one first trace is bi-directionally linked to the at least one second trace based on the decorator.

2. The computer-implemented method of claim 1, wherein the decorator identifies a linking entity associated with the at least one request of the at least one first trace to be linked and further identifies a linking entity associated with the another request processed by the child service of the at least one second trace.

3. A computer-implemented method comprising:
generating, by a batch trace manager, a decorator identifying at least one first trace that is associated with a request processed by a parent service in a provider network as being linked to at least one second trace that is associated with another request processed by a child service of the parent service in the provider network;
sending the decorator to a distributed tracing service in the provider network; and
adding, by the distributed tracing service, a virtual trace to a virtual trace map comprising a data structure including an entry for each trace, the virtual trace linking the at least one first trace and the at least one second trace, wherein the at least one first trace is bi-directionally linked to the at least one second trace based on the decorator.

4. The computer-implemented method of claim 3, further comprising:
obtaining a plurality of requests from a queue by the parent service, the parent service including the batch trace manager, at least one request of the plurality of requests corresponding to the at least one first trace.

5. The computer-implemented method of claim 3, wherein the child service obtains a plurality of requests corresponding to a plurality of traces including the at least one second trace, generates a second decorator identifying the plurality of traces to be linked to a third trace, and sends the second decorator to the distributed tracing service.

6. The computer-implemented method of claim 3, further comprising:
generating a plurality of requests to a plurality of child services, each of the plurality of requests corresponding to a plurality of traces including the at least one second trace.

7. The computer-implemented method of claim 3, further comprising:
receiving a request by the distributed tracing service to view the at least one first trace;
determining the at least one first trace is linked to the at least one second trace using the virtual trace map; and
returning the at least on first trace and the at least one second trace.

8. The computer-implemented method of claim 7, wherein the decorator identifies a linking entity of the at least one first trace to be linked and further identifies a linking entity of the at least one second trace.

9. The computer-implemented method of claim 8, wherein the linking entity of the at least one second trace identifies the linking entity of the at least one first trace.

10. The computer-implemented method of claim 9, wherein the linking entity of the at least one first trace identifies the linking entity of the at least one second trace.

11. A system comprising:
a first one or more electronic devices to implement a distributed tracing service in a multi-tenant provider network; and
a second one or more electronic devices to implement a batch tracing manager in the multi-tenant provider network, the batch tracing manager including instructions that upon execution cause the batch tracing manager to:
generate a decorator identifying at least one first trace that is associated with a request processed by a parent service in a provider network as being linked to at least one second trace that is associated with another request processed by a child service of the parent service in the provider network; and
send the decorator to the distributed tracing service in the provider network, wherein the distributed tracing service adds a virtual trace to a virtual trace map comprising a data structure including an entry for each trace, the virtual trace linking the at least one first trace and the at least one second trace, wherein the at least one first trace is bi-directionally linked to the at least one second trace based on the decorator.

12. The system of claim 11, wherein the instructions, when executed, further cause the batch tracing manager to:
obtain a plurality of requests from a queue by the parent service, the parent service including the batch trace manager, at least one request of the plurality of requests corresponding to the at least one first trace.

13. The system of claim 11, wherein the child service obtains a plurality of requests corresponding to a plurality of traces including the at least one second trace, generates a second decorator identifying the plurality of traces to be linked to a third trace, and sends the second decorator to the distributed tracing service.

14. The system of claim 11, wherein the instructions, when executed, further cause the batch tracing manager to:
generate a plurality of requests to a plurality of child services, each of the plurality of requests corresponding to a plurality of traces including the at least one second trace.

15. The system of claim 11, wherein the distributed tracing service includes second instructions that, when executed, further cause the distributed tracing service to:
receive a request to view the at least one first trace;

determine the at least one first trace is linked to the at least one second trace using the virtual trace map; and return the at least on first trace and the at least one second trace.

16. The system of claim 15, wherein the decorator identifies a linking entity of the at least one first trace to be linked and further identifies a linking entity of the at least one second trace.

17. The system of claim 16, wherein the linking entity of the at least one second trace identifies the linking entity of the at least one first trace and wherein the linking entity of the at least one first trace identifies the linking entity of the at least one second trace.

\* \* \* \* \*